April 23, 1929.  W. E. MOBLEY  1,710,429
SIGN CLOTH HOLDER
Filed Jan. 11, 1928
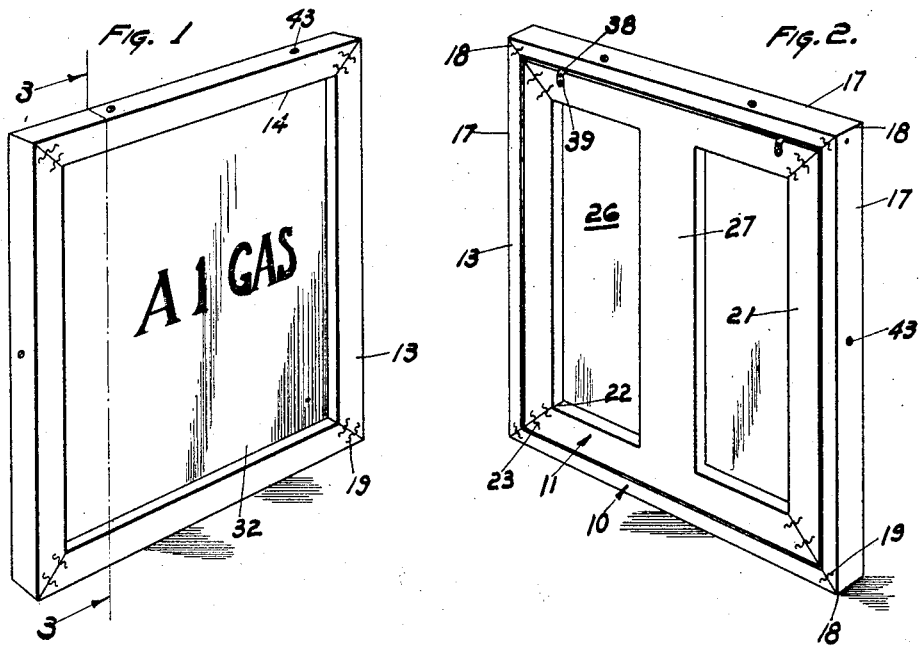
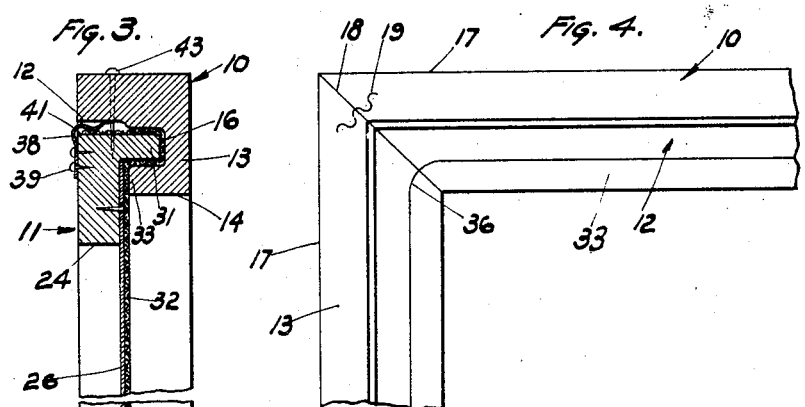
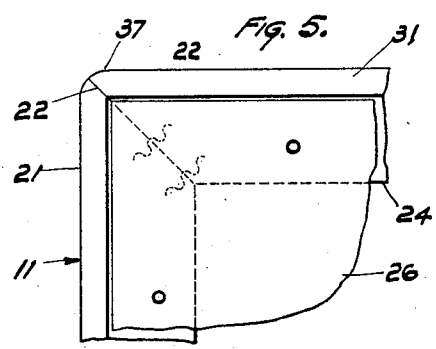
Inventor
WILLIAM E. MOBLEY
by Hazard and Miller
Attorneys.

Patented Apr. 23, 1929.

1,710,429

UNITED STATES PATENT OFFICE.

WILLIAM E. MOBLEY, OF LOS ANGELES, CALIFORNIA.

SIGN-CLOTH HOLDER.

Application filed January 11, 1928. Serial No. 245,920.

This invention relates to display devices, and has for an object the provision of means for positioning a removable display sheet of such a nature as to be readily interchangeable.

Another object of the invention is the provision of a pair of frames within which a display sheet may be positioned, and capable of stretching the display sheet taut as one frame is being brought into position upon the other.

The invention possesses other objects and features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to the drawings wherein similar reference characters denote similar parts throughout:

Figure 1 is a front, perspective view of the display device of my invention.

Figure 2 is a rear, perspective view of the device of Figure 1.

Figure 3 is an enlarged, transverse, sectional view of the device, the plane of section being indicated by the lines 3—3 of Figure 1; and portions being broken away to reduce the length of the figure.

Figure 4 is an enlarged, rear view of one corner of the outer frame.

Figure 5 is an enlarged, front view of one corner of the inner frame.

The display device of my invention comprises an outer frame designated in the drawings in its entirety by the numeral 10 and an inner frame designated in its entirety at 11, receivable within a recess 12 in the back of the outer frame 10, it being understood that the outer frame 10 is merely a rim 13 surrounding a central aperture 14. A groove 16 is provided in the bottom of the recess 12 around the periphery of the frame 10. For the sake of convenience, the frames may be composed of a plurality of strips 17 fitted together at their ends as at 18 and retained in this position by suitable fastening means such as the corrugated fasteners 19.

The inner frame 11 may be similarly formed of a plurality of strips 21 fitted together at their ends as at 22 and retained in position by the fasteners 23. The aperture 24 surrounded by the strips 21 may be closed by a sheet 26 of galvanized iron or other suitable material; and a bracing strip 27 may be employed to add strength to the inner frame 11. The inner frame 11 is provided with a tongue 31 projecting from its face around the periphery thereof, complementary to the groove 16.

From the above described structure it may be understood that a display sheet 32, which is preferably of any suitable fabric capable of having advertising matter placed thereon, may be positioned upon the inner frame 11 so that it extends thereacross, making contact with the top of the tongue 31 about the periphery of the frame. Then by placing the inner frame 11 in position within the recess 12 of the outer frame 10 the tongue will slide into the notch 16. The shoulder 33 about the inner periphery of the groove 16 will pull the display sheet 32 so as to slide it between the tongue 31 and the groove 16, but sufficient frictional resistance will be set up between these two elements to cause a considerable degree of tension to be placed upon the display sheet 32, causing it to be stretched taut in position between the frames to eliminate all wrinkles. There will naturally be a certain amount of fullness at the corners, and to allow for this the corners 36, defining the inner periphery of the groove 16, are relieved and the outer corners 37 of the tongue 33 are similarly relieved, thus leaving a suitable recess within which the fullness at the corners of the display sheet may be properly taken care of. To aid in positioning the display sheet upon the inner frame 11 a plurality of spring clips 38 are secured adjacent the periphery thereof. Preferably these clips are in the form of a strip of resilient metal, secured by fastening means 39 to the back of the frame 11 and bent so that the end 41 presses resiliently against the outer surface of the frame 11. The edge of the display sheet 32 may then be conveniently slipped beneath the clips 38 to properly position the display sheet before inserting into the outer frame 10. Any convenient means for fastening the two frames together with the display sheet retained there between may be employed, such as a plurality of pins 43 extending laterally through the frame 10 into the frame 11 to anchor it into position.

I claim:

1. In a display device, a display sheet, an inner frame having rounded corners, a plurality of resilient clips adjacent the periphery of said inner frame adapted to slidably engage the edge of said display sheet, a tongue extending from the face of said inner frame adjacent the periphery thereof, an outer frame having a recess in its back to receive said inner frame and having a groove complementary to said tongue in the bottom of said recess, the corners of said outer frame on the inner periphery of said groove being rounded, and a plurality of pins removably seated within apertures in both frames to retain them together.

2. In a display device, a display sheet, an inner frame having rounded corners, a plurality of resilient clips adjacent the periphery of said inner frame adapted to slidably engage the edge of said display sheet, a tongue extending from the face of said inner frame adjacent the periphery thereof, an outer frame having a recess in its back to receive said inner frame and having a groove complementary to said tongue in the bottom of said recess, the corners of said outer frame on the inner periphery of said groove being rounded.

3. In a display device, a display sheet, an inner frame having rounded corners, a plurality of resilient clips adjacent the periphery of said inner frame adapted to slidably engage the edge of said display sheet, a tongue extending from the face of said inner frame adjacent the periphery thereof, and an outer frame having a recess in its back to receive said inner frame and having a groove complementary to said tongue in the bottom of said recess.

4. In a display device, a display sheet, an inner frame, a plurality of resilient clips adjacent the periphery of said inner frame adapted to slidably engage the edge of said display sheet, a tongue extending from the face of said inner frame adjacent the periphery thereof, and an outer frame having a recess in its back to receive said inner frame and having a groove complementary to said tongue in the bottom of said recess.

5. In a display device, a display sheet, an inner frame, a plurality of resilient clips adjacent the periphery of said inner frame adapted to slidably engage the edge of said display sheet, a tongue extending from the face of said inner frame adjacent the periphery thereof, and an outer frame having a groove adjacent its periphery complementary to said tongue.

6. In a display device, a display sheet, an inner frame, a plurality of resilient clips adjacent the periphery of said inner frame adapted to slidably engage the edge of said display sheet, a tongue extending from the face of said inner frame adjacent the periphery thereof, and an outer frame having a groove adjacent its periphery complementary to said tongue, the corners of said outer frame on the inner periphery of said frame being rounded.

7. In a display device, a display sheet, an inner frame having rounded corners, a plurality of resilient clips adjacent the periphery of said inner frame adapted to slidably engage the edge of said display sheet, a tongue extending from the face of said inner frame adjacent the periphery thereof, and an outer frame having a groove adjacent its periphery complementary to said tongue, the corners of said outer frame on the inner periphery of said frame being rounded.

8. In a display device, a display sheet, a solid inner frame having rounded corners, a plurality of resilient clips adjacent the periphery of said inner frame adapted to slidably engage the edge of said display sheet, a tongue extending from the face of said inner frame adjacent the periphery thereof, an outer frame having a recess in its back to receive said inner frame and having a groove complementary to said tongue in the bottom of said recess, the corners of said outer frame on the inner periphery of said groove being rounded.

In testimony whereof I have signed my name to this specification.

WM. E. MOBLEY.